United States Patent
Shah et al.

(10) Patent No.: US 6,941,407 B2
(45) Date of Patent: Sep. 6, 2005

(54) METHOD AND APPARATUS FOR ORDERING INTERCONNECT TRANSACTIONS IN A COMPUTER SYSTEM

(75) Inventors: Paras A. Shah, Houston, TX (US); Ryan J. Hensley, Houston, TX (US); Randall J. Pascarella, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 358 days.

(21) Appl. No.: 10/259,215

(22) Filed: Sep. 27, 2002

(65) Prior Publication Data

US 2004/0064626 A1 Apr. 1, 2004

(51) Int. Cl.⁷ .......................... G06F 13/14; G06F 13/36
(52) U.S. Cl. .................. 710/310; 710/306; 718/100
(58) Field of Search .................... 710/240, 244, 710/112, 310, 311, 316, 317, 52, 104, 305, 306, 313, 105; 709/200, 227; 707/201; 718/102, 100

(56) References Cited

U.S. PATENT DOCUMENTS

| | | | | |
|---|---|---|---|---|
| 5,870,567 A | * | 2/1999 | Hausauer et al. | 710/310 |
| 5,870,760 A | * | 2/1999 | Demers et al. | 707/201 |
| 5,996,036 A | * | 11/1999 | Kelly | 710/110 |
| 6,199,131 B1 | * | 3/2001 | Melo et al. | 710/107 |
| 6,272,600 B1 | * | 8/2001 | Talbot et al. | 711/140 |
| 6,324,612 B1 | * | 11/2001 | Chen et al. | 710/306 |
| 6,801,976 B2 | * | 10/2004 | Creta et al. | 710/310 |

OTHER PUBLICATIONS

"Resequencing delay for a queueing system with two heterogeneous servers under a threshold–type scheduling" by Iliadis, I.; Lien, L.Y.–C. (abstract only) Publication Date: Jun. 1988.*

"Intelligent performance management of networks for advanced manufacturing systems" by Suk Lee et al. (abstract only) Publication Date; Aug. 2001.*

* cited by examiner

Primary Examiner—Gopal C. Ray

(57) ABSTRACT

A system allows queuing interconnect transactions of a first transaction type and a second transaction type according to an interconnect protocol for a computer system in a transaction order queue (TOQ). The queuing technique imposes an additional ordering on interconnect transactions in addition to ordering rules of the interconnect protocol. Transactions can bypass the TOQ if no transactions of the first type are awaiting execution or are in the TOQ. Transactions are dequeued from the TOQ if no transactions of either the first transaction type or the second transaction type are awaiting scheduling for execution.

19 Claims, 4 Drawing Sheets

METHOD AND APPARATUS FOR ORDERING INTERCONNECT TRANSACTIONS IN A COMPUTER SYSTEM

CROSS-REFERENCE TO RELATED APPLICATIONS

The following related patent applications are hereby incorporated by reference as if set forth in their entirety:

U.S. patent application Ser. No. 09/749,111, entitled "Relaxed Read Completion Ordering in a System Using a Transaction Order Queue," now U.S. Pat. No. 6,615,295, filed Dec. 26, 2000;

U.S. patent application Ser. No. 09/779,424, published as U.S. Patent Application Publication No. 2002/0108004, entitled "Enhancement to Transaction Order Queue," filed Feb. 8, 2001;

U.S. patent application Ser. No. 10/038,844, published as U.S. Patent Application Publication No. 2003/0126342, entitled "System to Optimally Order Cycles Originating from a Single Physical Link," filed Dec. 31, 2001;

U.S. patent application Ser. No. 10/039,130, published as U.S. Patent Application Publication No. 2003/0126029, entitled "Inter-Queue Ordering Mechanism," filed Dec. 31, 2001; and U.S. patent application Ser. No. 10/259,241, published as U.S. Patent Application Publication No. 2004/0064627, entitled, "Method and Apparatus for Ordering Interconnect Transactions in a Computer System," filed Sep. 27, 2002.

STATEMENTS REGARDING FEDERALLY SPONSORED RESEARCH OR DEVELOPMENT

Not applicable.

REFERENCE TO A MICROFICHE APPENDIX

Not applicable.

BACKGROUND OF THE INVENTION

1. Field of the Invention

The present invention relates to the field of interconnects for computer systems and in particular to ordering interconnect transactions in a computer system.

2. Description of the Related Art

Many industry standard and proprietary interconnects require transactions on the interconnect to be ordered according to certain rules to maintain memory consistency throughout the system, to enable proper functioning of cache coherency protocols, and to avoid livelock, deadlock, and other undesirable conditions. The PCI-X Extensions to the Peripheral Component Interconnect (PCI) specification allows for the general ordering rules to be relaxed for certain transactions, by specifying a "relaxed-ordering" attribute.

In a modern computer system, there is a great advantage to be gained by using the PCI-X relaxed ordering attribute. The PCI-X relaxed ordering attribute indicates that a PCI-X initiator can allow the data written to reach memory in any order. The attribute can be used for the "payload" part of an I/O transfer, which usually makes up the bulk of the I/O transfer from an I/O adapter. The performance gain can be attributed to at least three factors: First, by using the relaxed ordering attribute, cycles from one adapter are not blocked behind cycles from another adapter. Second, if multiple memory controllers exist in the computer system, write data can be sent to each memory controller simultaneously rather than waiting for each write to receive a completion notification before running the next. In a multiple memory controller system, memory can be "striped" across the memory controllers, so even a contiguous block of write data can target several separate memory controllers. Third, because each memory controller is typically an independent entity, the writes are processed much faster than if a single memory controller was processing the entire stream of writes.

Simply allowing relaxed order writes to be run whenever they occur can result in problems, however, because of the interaction of relaxed order write cycles with non-relaxed order (regular) writes. As the PCI-X specification outlines, relaxed order writes may pass regular order writes, but not vice-versa. Thus, relaxed order writes are free to be run when they are received by core logic comprising an I/O subsystem for a computer system. Regular order writes, however, must wait until ordering of all previously accepted writes is guaranteed before they can be run. The result is that under some circumstances a stream of relaxed order writes can starve one or more regular order writes, degrading system performance and potentially causing failures due to timeouts within the operating software. If the core logic simply runs relaxed order writes as soon as it receives them, it may starve out other regular order writes.

Transaction ordering queues (TOQs) are known for enforcing the ordering rules of interconnect protocols, ensuring that interconnect transactions will execute in an order consistent with the ordering rules. As such, not all interconnect transactions typically go into TOQs, but only those transactions for which ordering rules apply. Transaction ordering queues are typically implemented as first-in-first-out (FIFO) queues.

BRIEF SUMMARY OF THE INVENTION

A disclosed embodiment provides for a mechanism for imposing a stricter order on interconnect transactions than imposed by an interconnect protocol. This is accomplished by using a transaction order queue (TOQ) to order interconnect transactions. In one embodiment, if the interconnect transaction is of a second type and no interconnect transaction of a first type are in the TOQ, the interconnect transaction bypasses the TOQ. Enqueuing transactions in the TOQ imposes a stricter ordering than imposed by the interconnect protocol.

In one embodiment, transactions can be dequeued from the TOQ if no write transactions are awaiting scheduling. In a further embodiment, transactions of the second type can be dequeued from the TOQ regardless of whether write transactions are awaiting scheduling.

BRIEF DESCRIPTION OF THE SEVERAL VIEWS OF THE DRAWINGS

A better understanding of the present invention can be obtained when the following detailed description of the disclosed embodiments is considered in conjunction with the following drawings, in which.

DETAILED DESCRIPTION OF THE INVENTION

A technique is disclosed herein for enhancing the operation of computer system interconnects that use the extensions to the Peripheral Component Interconnect specification (hereinafter PCI-X interconnects), as well as logic circuits and signal protocols thereof. For illustrative purposes, embodiments are described herein for computer systems using Intel Corporation microprocessor architectures and certain terms and references are specific to such processor platforms. PCI-X and the enhancements described herein, however, are hardware independent, and may be used with any host computer designed for this interconnect standard. As will be appreciated by those skilled in the art of computer systems, the disclosed embodiments can be adapted and applied to any computer platform utilizing the PCI-X standard. Further, although the following is described in terms of PCI-X interconnects, other interconnect architectures and protocols, such as the PCI Express (formerly known as 3GIO) interconnect architecture and protocol being promoted by Intel Corporation, Hewlett Packard Corporation, Microsoft Corporation, IBM Corporation, and Dell Computer Corporation, could also be used. In addition, although the following is described in terms of relaxed order write transactions and regular order write transactions, other interconnect transaction types could be used.

Figure 1:
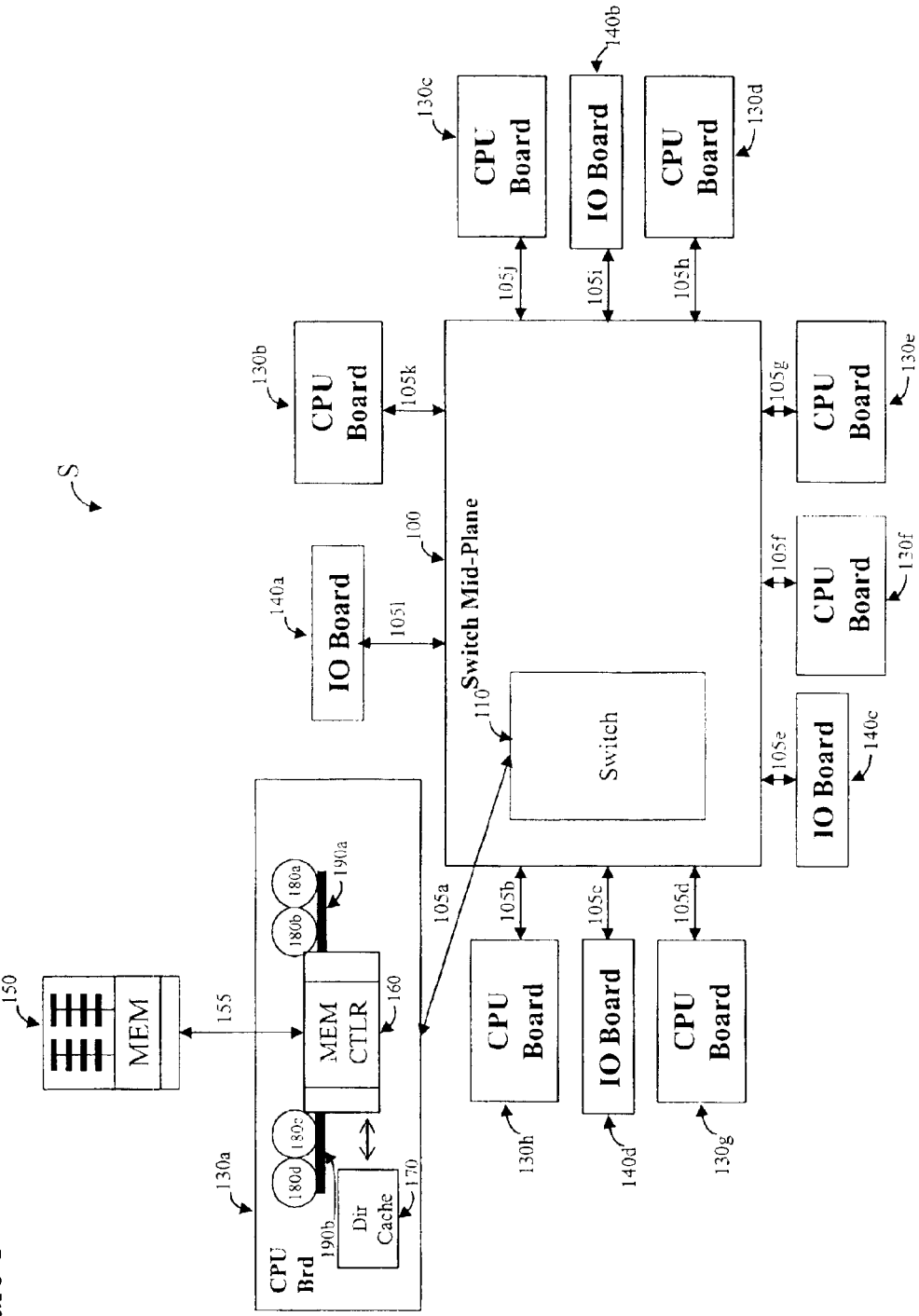
FIG. 1 is a block diagram of a multiple node computer system S according to one embodiment.

Turning to FIG. 1, a block diagram illustrates a multiple node computer system S according to one embodiment. A switch mid-plane 100 containing a switch 110 provides switched connectivity via busses 105a–105l between the CPU boards 130a–130h and I/O boards 140a–140d, each of which is a node of the computer system S. One skilled in the art will recognize that the number and arrangement of the CPU boards 130 and I/O boards 140 is illustrative and exemplary only, and other number and arrangements of CPU boards 130 and I/O boards 140 can be used. One feature of the switch 110 is that the switch 110 is non-ordering across nodes. Transactions passed to the switch 110 for different CPU or I/O boards can be processed in any order. However, the switch 110 is strongly ordered for transactions between the same source node and same destination node.

A typical CPU board 130a can contain multiple CPUs 180a–180d, connected to a memory controller 160 via host busses 190a–190b. The memory controller 160 is also typically connected to a cache 170 and a memory 150. In one embodiment, the host busses 190 are McKinley busses as defined by Intel Corporation. A high-speed memory bus 155 connects the memory controller 160 and the memory 150. The internal structure of the CPU boards 130 and the number of CPUs 180 and memories 150, types of host busses 190, cache 170, and memory controller 160 is not significant to the present invention. One skilled in the art will recognize that other elements, number and arrangement of elements in the CPU boards 130 can be used Turning to FIG. 2, a typical I/O board 140 of the embodiment of FIG. 1 is shown in greater detail. The I/O board 140 provides support for seven 100 MHz PCI-X busses 230a–230g, each of which can support two slots according to the PCI-X protocol, for a total of fourteen 100 MHz slots. In addition, a 33 MHz PCI bus 240 provides a single 33 MHz PCI slot, as well as connections to other legacy I/O devices 260, such as a serial controller. One skilled in the art will recognize that the numbers and speeds of PCI-X busses 230 are exemplary and illustrative only, and other numbers and speeds of PCI-X busses 230 can be used.

The PCI-X and PCI busses 230–240 are connected in pairs to PCI-X Host Bridges 220a–220d, which are in turn connected via host busses 250a–250d to a master controller 210. The master controller 210 is connected to the switch midplane 100 via a bus 105, as shown above in FIG. 1.

Figure 2:
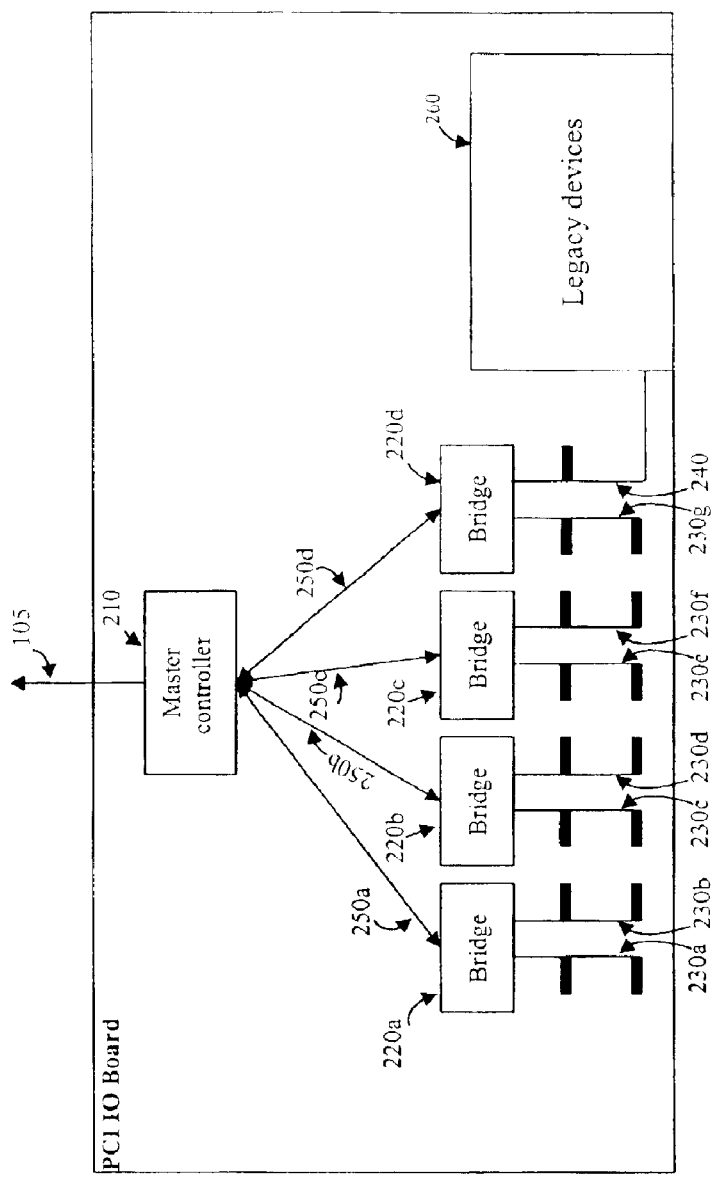
FIG. 2 is a block diagram of an I/O node of the computer system S of FIG. 1.

One skilled in the art will recognize that other elements, numbers of elements, and arrangements of elements can be used in the I/O board of FIG. 2. Further, although the I/O board of FIG. 2 is shown as a separate board in FIG. 1, the CPU and I/O boards can be integrated into a single board or multiple boards as desired.

Figure 3:
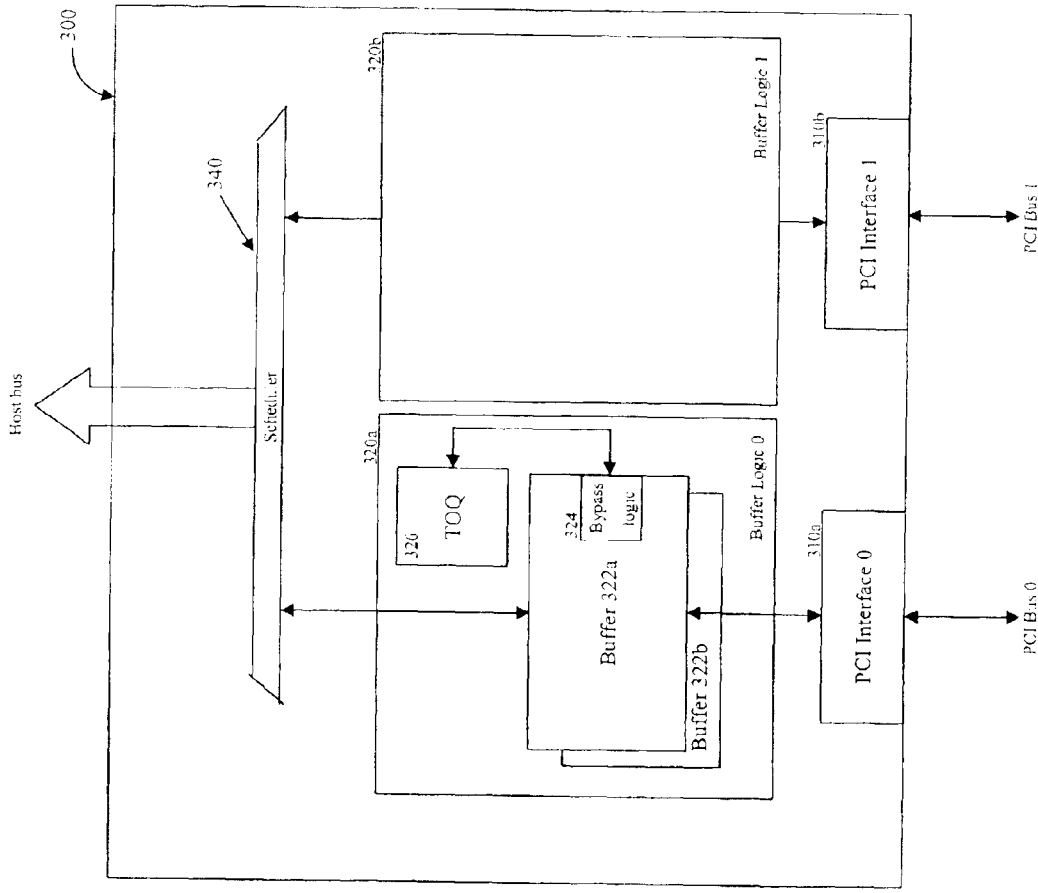
FIG. 3 is a block diagram of a PCI-X Host Bridge of the I/O node of FIG. 2 according to one embodiment.

Turning now to FIG. 3, PCI-X Host Bridge 300, corresponding to the PCI-X Host Bridges 220 of FIG. 2 is illustrated. Certain common elements of the PCI-X Host Bridge 300 are omitted for clarity of the drawing. PCI interface 310a is connected to buffer logic 320a, while PCI interface 310b is connected to buffer logic 320b. Buffer logic 320b is identical to buffer logic 320a and operates in the same manner, and the internal structure of buffer logic 320b is omitted for clarity of the drawing. As shown in FIG. 3, the PCI-X Host Bridge 300 includes a pair of PCI interfaces 310a and 310b, for connecting to PCI-X bus 0 and PCI-X bus 1, corresponding to two of the PCI-X busses 230 of FIG. 2. However, one skilled in the art will recognize that the PCI-X Host Bridge 300 can be implemented with a single PCI-X interface 310 and buffer logic 320. The discussion below will describe operation of the buffer logic 320a.

The buffer logic 320a includes a plurality of buffers 322. Although only two buffers 322a and 322b are shown for clarity of the drawings, one of skill in the art will recognize that any number of buffers 322 can be used. In one disclosed embodiment, four buffers 322 are used. Each of the buffers 322 contains a bypass logic 324, which is described in greater detail below. The buffer logic 320a also contains a transaction order queue (TOQ) 326, for ordering transactions in the buffers 322. A transaction received from the PCI Interfaces 310 is stored in one of the buffers 322 before being scheduled by the scheduler 340. Transactions received from the PCI Interface 310a are generally added to the TOQ 326 for ordering purposes after the transactions are stored in one of the buffers 322. As shown below, however, under certain circumstances, the TOQ 326 can be bypassed, such as when no write transactions are in progress in the PCI-X Host Bridge 300. Although the following description refers to transactions being "in the TOQ," the TOQ 326 typically does not store the transactions, but stores sufficient information about the transactions contained in the buffers 322 to allow ordering the transactions. Write transactions that are ordered by the TOQ 326 retain their relaxed or regular ordering attributes, allowing these transactions to be processed according to their transaction type at a later processing stage, so that relaxed order transactions can pass other transactions when desired. The TOQ 326 is typically implemented as a first-in-first-out (FIFO) queue.

The bypass logic 324 allows each of the buffers 322 to decide whether to bypass adding the transaction contained in the buffer to the TOQ 324 as described below. By adding relaxed order transactions to the TOQ 326, an additional ordering on transactions is imposed beyond the conventional PCI-X ordering rules, allowing the buffer logic 320a to avoid the undesirable starvation conditions described above. In one embodiment, the bypass logic incorporates a signal that indicates whether any regular order or relaxed order write transactions are awaiting scheduling or are in the TOQ 326, the signal being sent to all of the buffers 322. A signal that indicates whether any regular order or relaxed order write transactions are awaiting scheduling is sent to the TOQ 326.

By enqueuing relaxed order transactions on the TOQ 326, relaxed order transactions will not pass any regular order write transaction that precedes it, thus avoiding a starvation problem involving a stream of relaxed order write transactions passing a regular order write transaction, which would otherwise be allowed by the PCI-X protocol.

As shown in FIG. 3, scheduler 340 connects the outputs of buffer logics 320a and 320b, allowing interconnect transactions from both interconnects PCI Bus 0 and PCI Bus 1 to be sent across the host bus to the master controller 275 of FIG. 2.

One skilled in the art will recognize that the PCI-X Host Bridge 300 can be used with connections to more than two PCI buses, with corresponding numbers of PCI interfaces 310 and buffer logics 320. Further, one skilled in the art will recognize that the PCI-X Host Bridge 300 can be implemented in software (including firmware), hardware, or a combination of software and hardware.

Figure 4B:
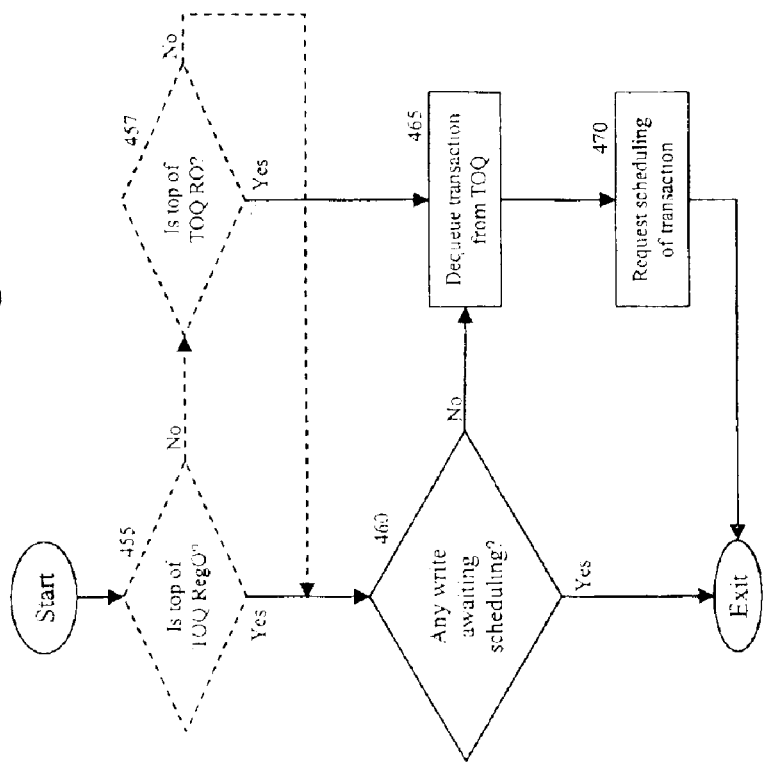
FIGS. 4a and 4b are flowcharts illustrating exemplary steps in processing transactions using a transaction order queue (TOQ) according to the embodiment of FIG. 3.
Figure 4A:
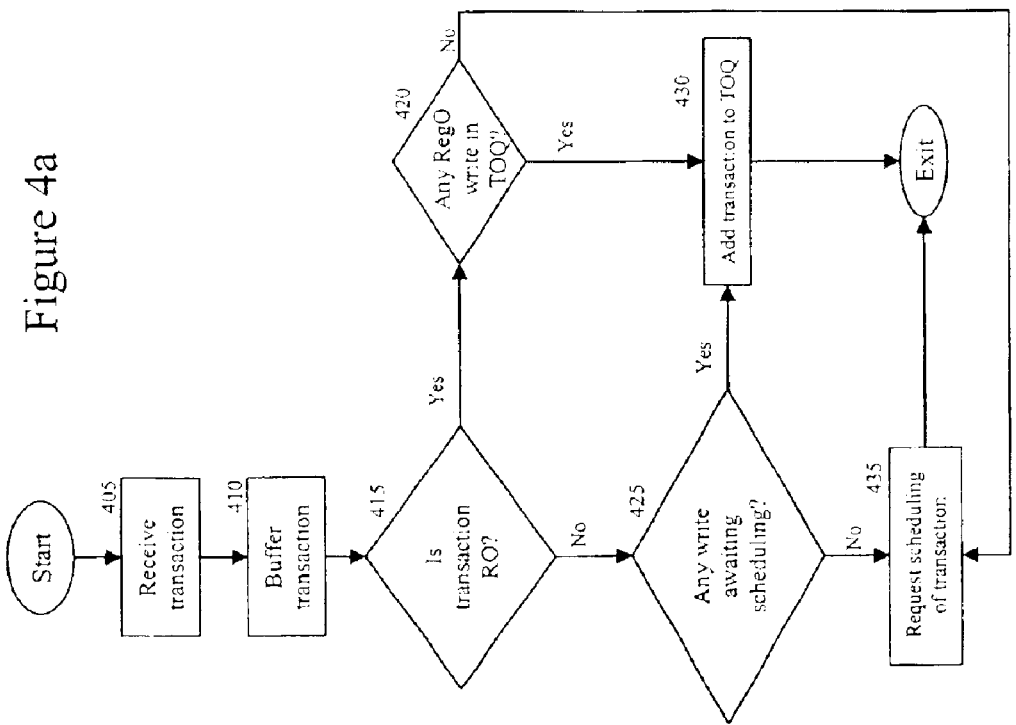

FIGS. 4a and 4b are flowcharts illustrating exemplary steps in processing interconnect transactions according to the embodiment of FIG. 3, using the PCI interface 310a and buffer logic 320a. Corresponding steps are used for PCI interface 310b and buffer logic, 320b. One skilled in the art will recognize that the illustrated steps are exemplary and illustrative only and other steps and ordering of steps can be used. The following steps assume that the transactions are write transactions. Other types of transactions are buffered through the buffer logic 320 and ordered by the TOQ 326, but will not be further considered.

In step 405, an incoming transaction is received from the PCI interface 310a. The incoming transaction is stored in one of the buffers 322 by the buffer logic 320a in step 410. Then, in step 415, the bypass logic 324 determines whether the incoming transaction is a relaxed order transaction, by checking the relaxed order attribute, as defined in the PCI-X Specification, a copy of which is incorporated in its entirety herein by reference. If the incoming transaction is a relaxed order transaction, then in step 420, the bypass logic 324 determines whether any regular order write transactions (which have the relaxed order attribute unset) are awaiting scheduling or are in the TOQ 326. If no regular order writes are awaiting scheduling and no regular order writes are in the TOQ 326, then the relaxed order write can bypass the TOQ 326 and scheduling of the incoming transaction is requested in step 435.

If the incoming transaction is a relaxed order write and the TOQ 326 does contain regular order write transactions, then the incoming transaction is added to the TOQ 326 in step 430, to order it with the regular order write transaction, rather than bypassing the regular order write transaction. A transaction ordered in the TOQ 326 is not scheduled for execution until it is dequeued from the TOQ 326. This ensures that a stream of relaxed order transactions does not starve regular order transactions.

If the incoming transaction is a regular order transaction, then in step 425 the bypass logic 324 determines whether any write transactions are present in any of the buffers 322. If any write transactions are present, whether in the TOQ 326 or awaiting scheduling either after bypassing the TOQ 326 or being dequeued from the TOQ 326, the incoming write transaction is added to the TOQ 326 in step 430. Otherwise, the incoming transaction can be scheduled for execution in step 435. Thus, if no write transactions are in the buffer logic 320a, then the incoming transaction can be scheduled for execution without being ordered by the TOQ 326. However, if any write transactions are present in the buffer logic 320, an incoming regular order write is ordered by the TOQ 326 to preserve the conventional PCI-X ordering rules.

FIG. 4b illustrates exemplary steps for dequeuing transactions from the TOQ 326. In one embodiment, transactions can only be dequeued from the TOQ 326 if no other write transactions are awaiting scheduling. In this embodiment, in step 460, the TOQ 326 checks to see if any write transactions are awaiting scheduling in any of the buffers 322. If no write transactions are awaiting scheduling, then in step 465 the first or top transaction of the TOQ is dequeued, signaling the buffer 322 corresponding to the dequeued transaction to request scheduling of the dequeued transaction for execution in step 470. If any write transactions are awaiting scheduling, however, no transactions are dequeued until a later clock cycle.

In one embodiment, relaxed order transactions can be dequeued from the TOQ 326 even if other write transactions are awaiting scheduling. In steps 455–457, shown in dashed lines, the TOQ 326 first checks to see if the transaction at the top of the TOQ 326 is a regular order transaction or a relaxed order transaction. If the transaction is a relaxed order transaction, then in step 465 it is dequeued from the TOQ 326 and the buffer 322 signaled to request scheduling of the dequeued transaction in step 470. This avoids a starvation condition which could occur where a relaxed order transaction in the TOQ 326 could be starved in the TOQ 326 by a stream of relaxed order transactions received from the PCI Interface that could bypass the TOQ 326 because no regular order transaction are in the TOQ 326.

The scheduler 340 can select transactions for execution in any order after the buffer logic 320 has requested scheduling a transaction contained in one of the buffers 3202. Thus, the above technique ensures that ordering of regular order transactions is preserved, while allowing relaxed order transactions to bypass regular order and other relaxed order transactions, but undesirable conditions that would allow a stream of relaxed order writes to starve a regular order write transaction. Thus overall performance of the computer system S is enhanced by imposing the stricter transaction ordering in the buffer logic 320, while preserving the performance advantages of using relaxed order write transactions.

The foregoing disclosure and description of the disclosed embodiments are illustrative and explanatory thereof, but to the extent foreseeable, the spirit and scope of the invention are defined by the appended claims.

We claim:

1. A method of ordering interconnect transactions in a computer system, comprising:

receiving an interconnect transaction from an interconnect interface, the interconnect interface operating according to an interconnect protocol;

enqueuing the interconnect transaction as a queued transaction on a transaction ordering queue (TOQ), imposing a stricter ordering on the queued interconnect transaction than an interconnect-protocol-imposed ordering, wherein the interconnect protocol allows a first type interconnect transaction to pass a second type interconnect transaction, wherein imposing the stricter ordering comprises preventing a first type interconnect transaction enqueued in the TOQ from passing a second type interconnect transaction enqueued in the TOQ; and dequeuing the queued transaction from the TOQ as a dequeued transaction.

2. The method of claim 1, further comprising:

if the received interconnect transaction is of the first type and no transactions of the second type are in the TOQ, bypassing the enqueuing act.

3. The method of claim 1, wherein the interconnect interface operates according to the PCI-X extension of the PCI protocol.

4. The method of claim 3, wherein the first type interconnect transaction is a relaxed ordering transaction and the second type interconnect transaction is a non-relaxed ordering transaction.

5. The method of claim 1, wherein the dequeuing is performed once per clock cycle, if any transactions are in the TOQ.

6. The method of claim 1, wherein dequeuing the queued transaction comprises:
determining whether any second type interconnect transaction is awaiting execution;
if no second type interconnect transactions are awaiting execution, dequeuing the queued transaction from the TOQ as a dequeued transaction; and
scheduling the dequeued transaction for execution.

7. The method of claim 6, wherein dequeuing the queued transaction comprises:
determining whether the queued transaction is of the first type;
if the queued transaction is of the first type, then dequeuing the queued transaction as a dequeued transaction; and
scheduling the dequeued transaction for execution.

8. A system for ordering interconnect transactions in a computer system, comprising:
an interconnect interface, coupled to an interconnect operating according to an interconnect protocol, adapted to receive interconnect transactions; and
a transaction ordering queue (TOQ), coupled to the interconnect interface, adapted to queue interconnect transactions received by the interconnect interface as queued transactions of a first transaction type and a second transaction type, wherein a stricter ordering is imposed on the interconnect transactions than an interconnect-protocol-imposed ordering, the TOQ further adapted to dequeue queued transactions as dequeued transactions,
wherein the interconnect protocol allows interconnect transactions of the second transaction type to pass interconnect transactions of the first transaction type, and
wherein an interconnect transaction of the second transaction type enqueued in the TOQ can not pass an interconnect transaction of the first transaction type previously enqueued in the TOQ.

9. The system of claim 8, the TOQ comprising:
circuitry to queue interconnect transactions in a first-in-first-out (FIFO) queue; and
circuitry to dequeue a queued transaction from the FIFO queue.

10. The system of claim 9, the circuitry to queue interconnect transactions in a FIFO queue comprising:
circuitry to bypass queuing an interconnect transaction of the second transaction type in the FIFO queue if no interconnect transactions of the first transaction type are in the FIFO queue.

11. The system of claim 9, the circuitry for dequeuing transaction from the FIFO queue comprising:
a first circuitry to determine whether any interconnect transactions of the first transaction type or the second transaction type are awaiting execution; and
a second circuitry to dequeue a transaction from the FIFO queue if no interconnect transactions of the first transaction type or the second transaction type are awaiting execution.

12. The system of claim 11, further comprising:
a third circuitry to determine whether a first transaction of the FIFO queue is an interconnect transaction of the second transaction type; and
a fourth circuitry to dequeue the first transaction from the FIFO queue if the first transaction is of the second transaction type.

13. The system of claim 8,
wherein the interconnect protocol is the PCI-X extension to the PCI protocol,
wherein interconnect transactions of the second transaction type have the Relaxed Ordering attribute set in an attribute phase of the interconnect transactions, and
wherein interconnect transactions of the first transaction type have the Relaxed Ordering attribute unset in the attribute phase of the interconnect transactions.

14. The system of claim 8, wherein interconnect transactions of the second transaction type are not enqueued in the TOQ if no interconnect transactions of the first transaction type are in the TOQ.

15. The system of claim 8, wherein the interconnect interface and the TOQ are implemented in an application-specific integrated circuit (ASIC).

16. The system of claim 8, wherein the interconnect interface and the TOQ are implemented in a PCI-X host bridge.

17. The system of claim 8, further comprising:
a plurality of buffers, the plurality of buffers storing the interconnect transactions,
wherein the TOQ stores information corresponding to the interconnect transactions sufficient to order the interconnect transactions.

18. A system comprising:
an interface according to a Peripheral Component Interconnect (PCI) protocol to receive a write transaction;
a transaction ordering queue (TOQ); and
circuitry to:
determine whether the received write transaction is a PCI relaxed ordering write transaction;
in response to determining that the received write transaction is a PCI relaxed ordering write transaction:
determining whether a PCI regular order write transaction is enqueued in the TOQ,
in response to determining that a PCI regular order write transaction is enqueued in the TOQ, enqueuing the received PCI relaxed ordering write transaction in the TOQ, and
in response to determining that a PCI regular order write transaction is not enqueued in the TOQ, bypassing enqueuing of the PCI relaxed ordering write transaction in the TOQ and allowing the received PCI relaxed ordering write transaction to be scheduled.

19. The system of claim 18, wherein the PCI protocol allows a PCI relaxed ordering write transaction to pass a PCI regular ordering write transaction, but wherein a PCI relaxed ordering write transaction in the TOQ is not allowed to pass a PCI regular ordering write transaction in the TOQ.

* * * * *